United States Patent [19]

Solum

[11] 3,782,555

[45] Jan. 1, 1974

[54] FEED DISTRIBUTION MEANS FOR VACUUM FILTERS

[75] Inventor: Dallas H. Solum, Salt Lake City, Utah

[73] Assignee: Envirotech Corporation, Salt Lake City, Utah

[22] Filed: Apr. 3, 1972

[21] Appl. No.: 240,438

[52] U.S. Cl. ............... 210/404, 162/321, 162/342, 210/456
[51] Int. Cl. ............................................. B01d 33/06
[58] Field of Search ................. 210/456, 402–405; 162/357, 321, 323, 342

[56] References Cited
UNITED STATES PATENTS
2,027,652   1/1936   Rauch ............................ 210/404
2,598,606   5/1952   Robison, Jr. ................. 210/404 X
1,627,882   5/1927   Berry ........................... 162/357 X
3,554,866   1/1971   Wynstla ........................ 162/321

Primary Examiner—Frank A. Spear, Jr.
Assistant Examiner—T. A. Granger
Attorney—Richard F. Bojanowski et al.

[57] ABSTRACT

A liquid feed distribution trough having an arcuate bottom is mounted horizontally along the upper edge of a rotary drum filter tank. Within the feed distribution trough, an elongated paddle wheel is rotatably mounted for distributing a liquid containing particulates evenly throughout the trough. The edge of the trough is provided with a curved overflow lip to permit the uniformly distributed feed to gravitationally flow from the trough into the tank. The particulates are subsequently separated from the liquid by the rotary drum filter.

1 Claim, 4 Drawing Figures

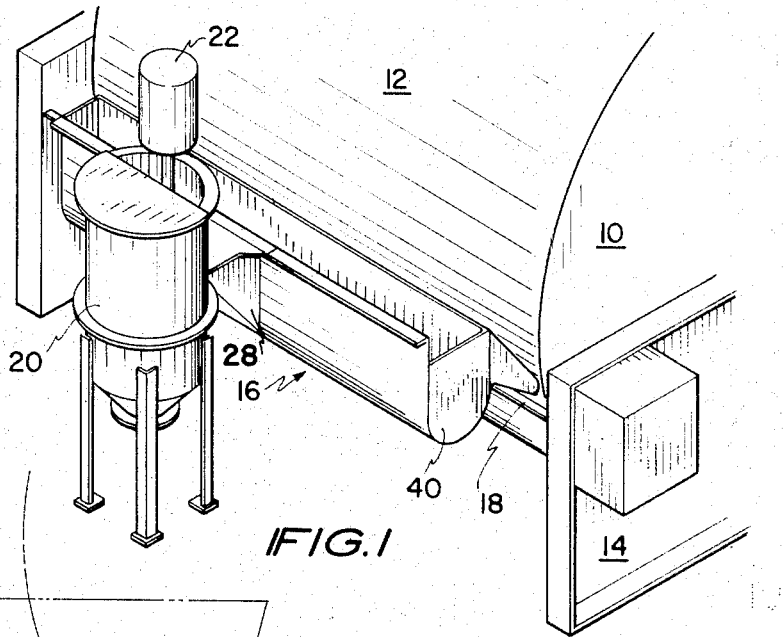
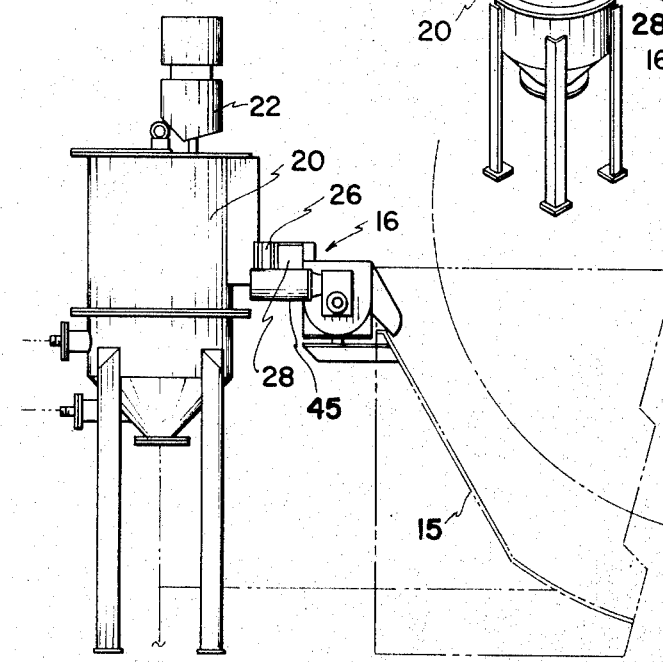
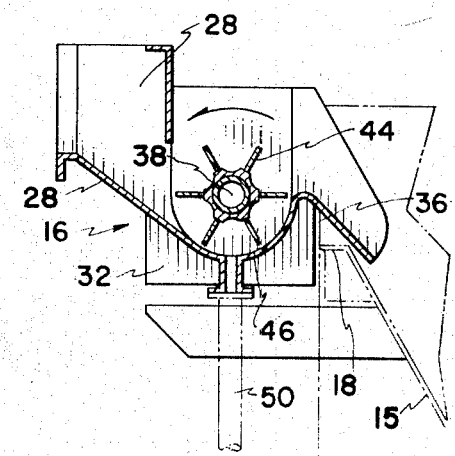
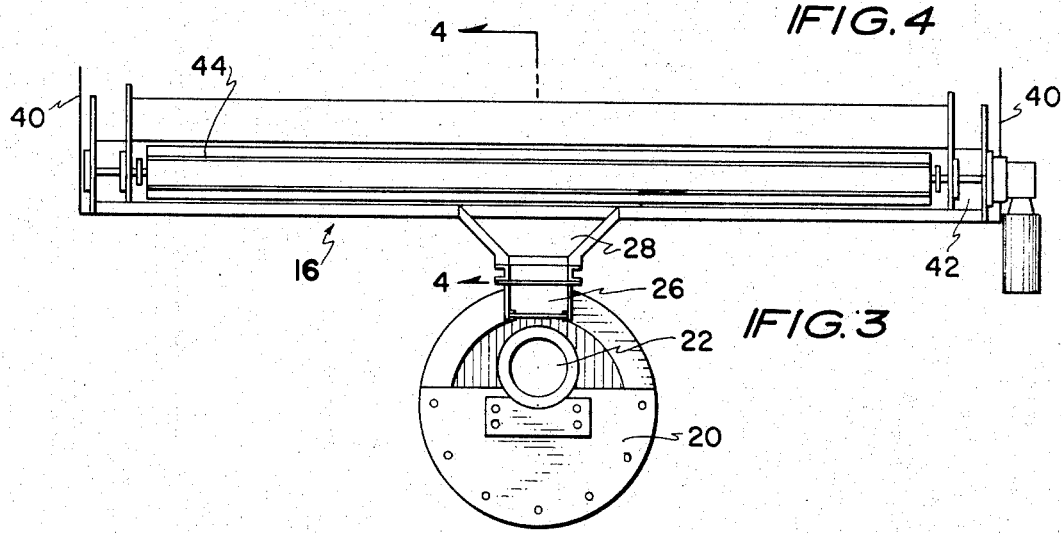

FEED DISTRIBUTION MEANS FOR VACUUM FILTERS

BACKGROUND OF THE INVENTION

1. Field

This invention relates to an improved rotary drum filter and particularly to a feed distribution system adapted for use on a rotary filter.

2. State of the Art

Rotary drum filters are well known in the filtration art. Such filters comprise generally a liquid holding tank in which a filter drum is rotatably mounted about its axis. The outside surface of the drum is covered by a filter medium across which a pressure differential is applied. A liquid feed containing particulates and suspendable solids is introduced into the tank whereupon the solids are separated from the liquid and collected on the filter medium as a filter cake.

Typically, the feed is introduced into the main tank through an inlet pipe located at or near the bottom of one end of the tank. As the feed is being introduced, some of the heavier solids therein tend to settle and collect at or near the inlet point. When this occurs, the cake formed on the drum is heavier at one end or deposits in uneven layers across the drum's surface. This imbalance causes inefficient filtering as only a part of the filter is being properly utilized. When several smaller and dispersed inlets are used to distribute the feed more evenly within the tank, some of the inlets eventually become totally or partially blocked requiring that the filter be removed from service and the inlets cleaned.

OBJECTS OF THE INVENTION

It is a primary object of this invention to provide means for uniformly distributing suspended solids in a liquid material.

A further object is to provide a feed distribution means which uniformly distributes and exposes feed materials to the face of a rotary drum filter.

BRIEF DESCRIPTION OF THE DRAWINGS

The feed distribution system hereinafter described may be more readily understood by referring to the accompanying drawings which are offered by way of example only and not in limitation of the invention, the scope of which is defined by the appended claims. In the drawings:

FIG. 1 is a pictorial view of a feed distribution system mounted to the front edge of a partially shown rotary drum filter;

FIG. 2 is a side elevation view partially in section of FIG. 1;

FIG. 3 is a top view of the feed distribution system shown in FIG. 1;

FIG. 4 is a cross-sectional view taken along line 4—4 of FIG. 3.

DETAILED DESCRIPTION OF THE INVENTION

As is partially shown in FIGS. 1 and 2, a conventional rotary drum filter comprises a filter drum 10 rotatably mounted in a main tank 14 having a rising wall 15. Overlying the drum is a filter medium 12. A feed distribution system (FIGS. 1–4) includes an elongated feed distribution trough, designated generally by 16, which is mounted to the rising edge 18 of the tank 14 and extends longitudinally thereacross. Preferably, the trough is positioned outwardly and beyond the end of the filter drum's horizontal radius. A feed storage or conditioning tank 20 containing a mixer 22 is positioned behind the feed distribution trough 16. The feed tank and trough communicate with each other by means of a flexible conduit 26 leading from the tank and into a downwardly extending duct 28 which opens into the trough. The trough 16 has an arcuate bottom 46 and is mounted on the tank's rising edge by suitable support brackets 32. A lip 36 which is integral with the trough's short side and overhangs into the tank 14 for directing the flow of liquid and solids from the trough into the tank. A shaft 38 extends longitudinally within the trough and is rotatably mounted to both of the trough's end walls 40 by suitable bearing means 42. In the drawings, the axis of the shaft is substantially parallel to the axis of the rotating filter.

Paddles or vanes 44 are fixed to the shaft and extend radially therefrom to just clear the inner surface of the trough's arcuate bottom 46. The paddles are longitudinally elongated and the combination of the paddles and the shaft may be described as a paddle wheel or starwheel. The vanes are formed from any suitable metal, rubber or plastic material and, if desired, may be coated with a protective coating to minimize corrosion.

A drive means 45 is provided to rotatably drive the shaft and, in turn, rotate the paddles which evenly distributes the feed throughout the length of the trough. In addition, the rotating paddles assist in transporting solids in a uniform manner longitudinally over the lip so that the solids may flow gravitationally downwardly along the rising wall 15 of the filter tank. A drain outlet 50 is provided to selectively empty the contents of the trough for cleaning or other purposes.

Means may also be provided for varying the rotational speed of the paddles. This feature permits a change in rotational speed if the concentration and/or composition of the feed should vary.

In operation the feed material is continuously fed into the feed distribution trough 16 from tank 20. The paddles 40 are rotated and the feed entering the trough is evenly distributed throughout the trough's length. When the trough becomes filled, a continuous flow of homogenous feed overflows from the trough into the main tank. Subsequent thereto, the solids are separated from the liquid in the tank by applying a vacuum to the undersurface of the filter drum.

Although the inventive system hereinbefore described has particular application to rotary vaccum drum filters, the system can also be applied to other types of filters such as disc or horizontal filters. It may also be used on pressure filters or combination pressure and vacuum filters.

I claim:

1. In a rotary drum vacuum filter of the type including a tank formed with ends and sidewalls and having a filter drum journalled in said ends for rotation in said tank, improved feed supply means comprising an elongated arcuate-bottomed trough extending along, adjacent to and above the top edge of one tank sidewall, one wall of said trough forming a lower overflow edge, means for supplying feed liquid into said trough and means for effecting even flow of said liquid over said edge for distribution along the length of said tank, said means comprising an elongated starwheel journalled for rotation in said trough, means for driving said starwheel, and an elongated lip connected to said edge along the length of the trough said lip being formed to slope downwardly from said edge to terminate in said tank at an elevation below said top edge of said one tank sidewall.

* * * * *